United States Patent

Park et al.

[11] Patent Number: 5,782,033
[45] Date of Patent: Jul. 21, 1998

[54] FISHING DEVICE WITH STRIKE DETECTION, DATA LOCK AND LINE BREAKAGE PROTECTION

[75] Inventors: Michael C. Park; Kenneth J. Park, both of Portland, Oreg.

[73] Assignee: Aquametrics Inc., Portland, Oreg.

[21] Appl. No.: 611,335

[22] Filed: Mar. 8, 1996

[51] Int. Cl.$^6$ ............................................ A01K 97/12
[52] U.S. Cl. ..................................................... 43/4; 43/17
[58] Field of Search ................... 43/4, 4.5, 17; 242/323

[56] References Cited

U.S. PATENT DOCUMENTS

| | | | |
|---|---|---|---|
| 3,670,985 | 6/1972 | Morishita | 242/323 |
| 3,711,036 | 1/1973 | Spraggins | 242/323 |
| 3,785,079 | 1/1974 | Rohn | 43/4 |
| 3,973,349 | 8/1976 | England et al. | 43/42.03 |
| 4,445,178 | 4/1984 | Scheer et al. | 43/4.5 |
| 4,516,348 | 5/1985 | Hirose et al. | 43/17 |
| 4,526,331 | 7/1985 | Tunks | 242/323 |
| 4,625,446 | 12/1986 | Morimoto | 43/17 |
| 4,658,531 | 4/1987 | Morimoto | 43/1.7 |
| 4,697,371 | 10/1987 | Hill | 43/4 |
| 4,731,946 | 3/1988 | Blythe et al. | 43/17 |
| 4,752,878 | 6/1988 | Sigurdsson et al. | 43/4 |
| 4,899,480 | 2/1990 | Park | 43/4 |
| 5,010,678 | 4/1991 | Peck | 43/17 |
| 5,088,223 | 2/1992 | Chu | 43/17 |
| 5,321,391 | 6/1994 | Fox | 43/17 |
| 5,483,767 | 1/1996 | Langer | 43/4 |
| 5,511,335 | 4/1996 | Langer | 43/4 |
| 5,546,695 | 8/1996 | Langer | 43/44.98 |
| 5,581,930 | 12/1996 | Langer | 43/17 |

FOREIGN PATENT DOCUMENTS 5284882  11/1993  Japan ........................ 43/4.5

*Primary Examiner*—Michael J. Carone
*Assistant Examiner*—Darren Ark
*Attorney, Agent, or Firm*—Elmer Galbi

[57] ABSTRACT

A conventional fish attracting device (i.e. a conventional lure or bait) is attached to a submersible unit. The submersible unit is attached to an electronic unit on a fishing rod by means of an optical cable. The submersible unit measures the amount of tension exerted by the fish attracting device (including the tension exerted by a fish pulling on the fish attracting device). The submersible unit also detects the aquatic conditions in the vicinity of the fish attracting device. The submersible unit transmits the tension exerted by the fish attracting device and the aquatic conditions to the unit on the fishing rod. The unit on the fishing rod determines if the tension exerted by the fish attracting device indicates that a "strike" has occurred and if the tension is nearing the tensile strength of the line. When a strike occurs the aquatic conditions are recorded along with the position of the strike. When the tension on the line nears the tensile strength of the fishing line (i.e. the tensile strength of the optical cable), the tension on the line is released.

2 Claims, 7 Drawing Sheets

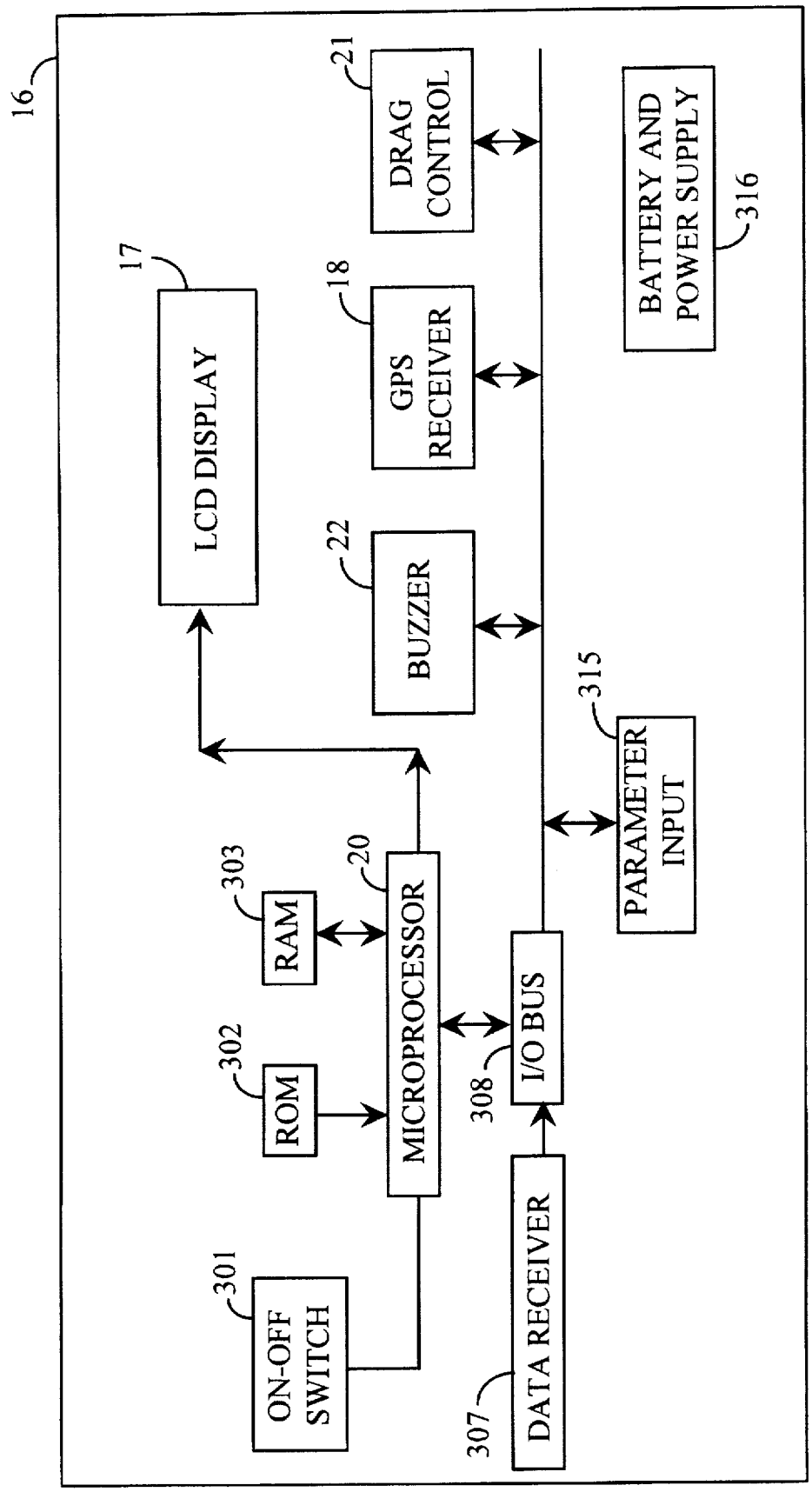
FIG. 3 (ELECTRONIC UNIT ON FISHING POLE)

FISHING DEVICE WITH STRIKE DETECTION, DATA LOCK AND LINE BREAKAGE PROTECTION

FIELD OF THE INVENTION

The present invention relates to fishing equipment and more particularly to fishing equipment with automatic strike detection and other related functions.

BACKGROUND OF THE INVENTION

In order to catch fish with a rod and reel, one must detect when a fish has bitten on the lure or bait, that is, one must detect a strike. Some fish such as Sturgeon bite very lightly and hence it is hard to detect a strike by such fish. Other times a heavy sinker is attached to the bait or lure making detection of a strike very difficult. The above and other problems in detecting strikes result in lost fish and lost bait. The present invention addresses this problem by providing a unique type of strike detection.

When a fish is caught, a fisherman often would like to later return to the same location with the same conditions (i.e. the same water depth, temperature, etc.) to catch additional fish. It is often a difficult task to record the exact location and water depth at the exact instant when a strike occurs. Furthermore, it would be desirable to record other parameters such as temperature at the instant a strike occurs. The present invention make it possible to record location, depth and other parameters at the instant that a fish strikes.

Another problem that fisherman experience is knowing exactly when to release tension on the fishing line in order to keep the line from breaking. The present invention provides an automatic means of increasing or decreasing the tension on a fishing line to keep optimum tension on the line.

Prior art (U.S. Pat. No. 4,899,480) shows a immersible probe attached to the end of an optic fiber fishing line. The optic fiber carries optic signals transmitted by the probe to a receiver an display unit on the fishing rod. The probe transmits data pertaining to aquatic conditions in the vicinity of a leader and hook attached to the probe. The present invention is an improvement on the system shown in U.S. Pat. No. 4,899,480.

SUMMARY OF THE INVENTION

With the present invention a fish attracting device (i.e. a conventional lure or bait) is attached to a submersible unit. The submersible unit is attached to an electronic unit on a fishing rod by means of an optical cable. The submersible unit measures the amount of tension exerted on the submersible unit by the fish attracting device. The submersible unit also detects the aquatic conditions in the vicinity of the fish attracting device. The submersible unit transmits the tension and the aquadic conditions to the unit on the fishing rod. The unit on the fishing rod determines if the tension exerted by the fish attracting device indicates that a "strike" has occurred and if the tension is nearing the tensile strength of the line. When a strike occurs the operator is notified and the aquadic conditions are recorded along with the position of the strike. When the tension on the line nears the tensile strength of the fishing line (i.e. the tensile strength of the optical cable), the tension on the line is released.

The submersible unit includes a strain gage, an analog to digital converter, a microprocessor and a transmission circuit for transmitting signals through an optical fiber (which servers as a fishing line) to an electronic unit located on the fishing rod. A fish attracting device (I.e. a lure or bait containing a hook) is attached to the strain gage.

The above water unit located on a fishing rod, includes a microprocessor, a circuit for detecting the signals transmitted from the underwater unit, a GPS (Global Positioning System) receiver which indicates the position of the unit, a display and a brake that controls the tension on the line.

BRIEF DESCRIPTION OF THE DRAWINGS

FIG. 3 is a block diagram of the electronic unit on the fishing rod.

DETAILED DESCRIPTION OF A PREFERRED EMBODIMENT

Figure 1:
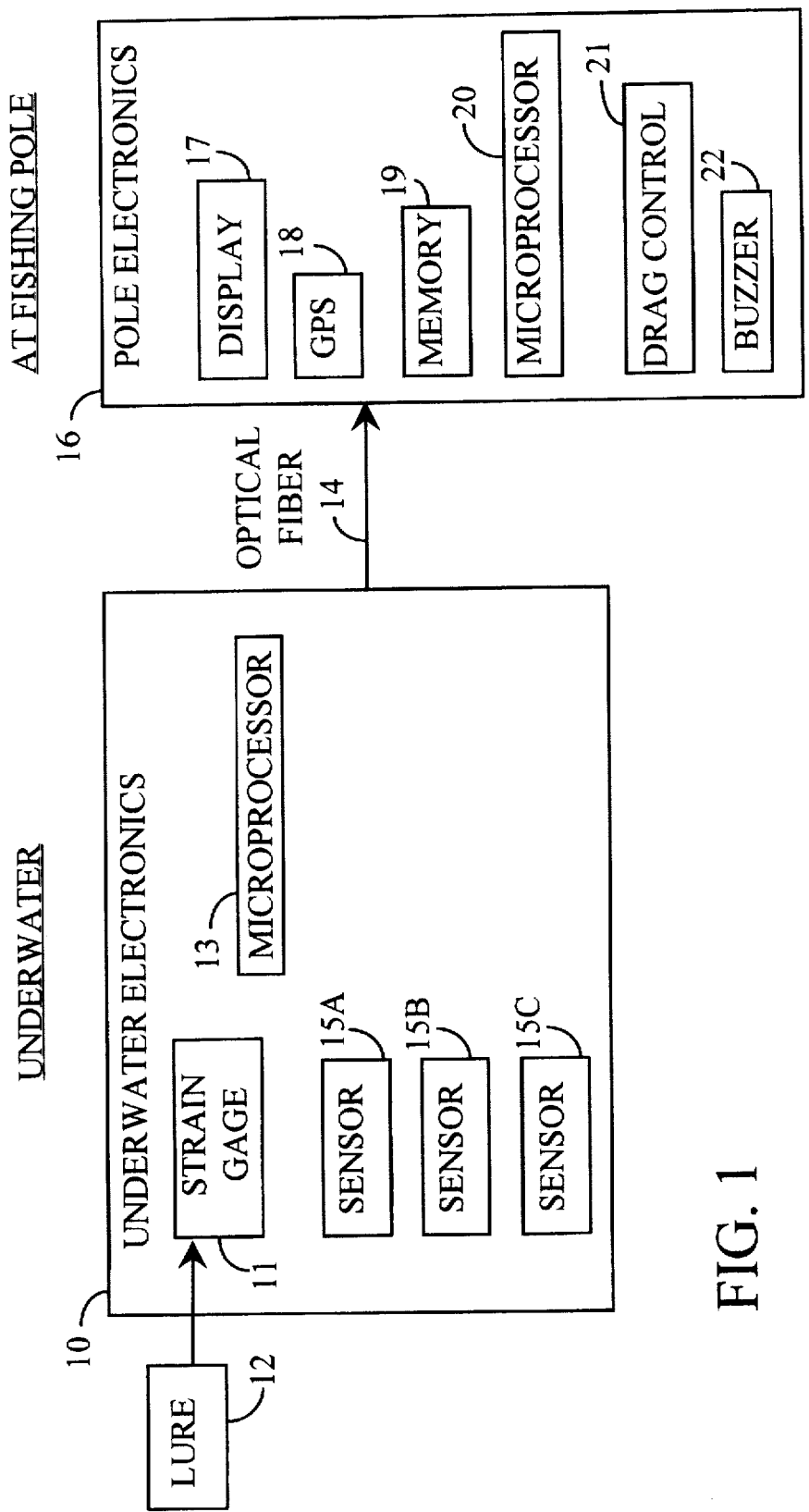
FIG. 1 is an overall schematic diagram of a preferred embodiment of the present invention.

As shown schematically in FIG. 1, the principle components of the preferred embodiment of the present invention are a submersible unit 10, an optical fiber 14 and an electronic unit 16. A physical plan view of unit 10 is shown in FIG. 5A. A perspective view of unit 16 is shown in FIG. 4A.

Submersible unit 10 includes a strain gage 11 which is attached to a conventional lure 12. Unit 10 also includes a plurality of sensors 15A, 15B, and 15C which detect various aquatic conditions such a pressure (i.e. depth), temperature and salinity. The electronic unit 16 is located on a fishing rod 26 as shown in FIG. 4A. As shown in FIG. 1, electronic unit 16 includes a display 17, a GPS (Global Positioning System) receiver 18, an electronic memory 19, a microprocessor 20, drag control circuitry 21 and buzzer 22. GPS receiver 18 is a conventional commercially available GPS receiver which at each instant of time gives the geographic coordinates indicating where the unit is physically located.

When a fish strikes and pulls on lure 12, the tension is detected by strain gage 11. The amount of tension is transmitted to unit 16 via optical cable 14. Unit 16 can determine from the amount of tension and the change in amount of tension that a strike has occurred. Unit 10 also transmits to unit 16 the aquatic conditions sensed by units 15A, 15B, and 15C. When a strike occurs, unit 16 displays a message to the fisherman indicating that a strike has occurred and at the same time stores in memory the location of the units (as indicated by GPS receiver 18) and the aquatic conditions detected by units 15A, 15B and 15C.

If the tension detected by strain gage 11 and transmitted to unit 16 is above the rated strength of the fishing line, i.e. exceeds the rated tension of the fishing line, unit 16 automatically reduces the tension.

The data recorded in memory 19, can later be retrieved to indicate the conditions and location where strikes occurred during the entire day. The memory 19 is large enough so that the conditions related to all the strikes occurring during a day can be recorded so that in the evening this data can either be displayed, printed or transferred to a personal computer for later analysis.

Figure 2:
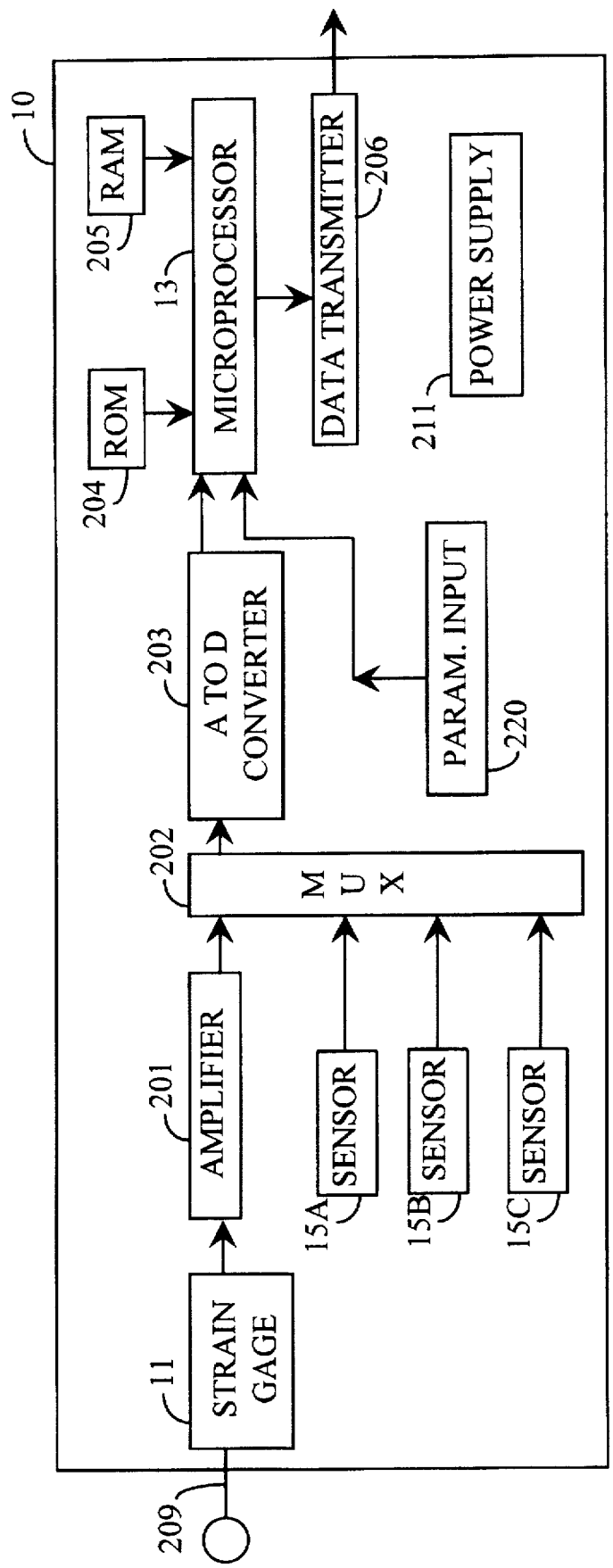
FIG. 2 is a block diagram of the electronic circuit in the submersible unit.

A block diagram of the electronic in unit 10 is shown in FIG. 2. The strain gage 11 is connected to an amplifier 201 which is connected to one input of a multiplexer 202. The output of the multiplexer goes to an analog to digital converter 203 and then to microprocessor 13. The output of the other sensors 15A, 15B and 15C also go through multiplexer 202 to microprocessor 13. Microprocessor 13 executes a program (described later) which is stored in a read only memory 204. The measurements from strain gage 11 and from sensors 15A, 15B and 15C are temporarily stored in Random access memory 205 and when there is a significant change in the value of the measurements, the microprocessor 204 activates a Data Transmitter 206 which generates and transmits light signals through the optical fiber 14 to the electronic unit 16. Data transmitter 206 can consist of a convention al LED (Light Emitting Diode). The electronics components in unit 10 are each conventional electronic components.

Not shown in FIG. 2, but included in unit 10 is a clock which generates timing pulses to time the operation of the various electronic components and an on-off switch. The arrangements of such components is shown in FIG. 2 of U.S. Pat. No. 4,899,480 which is hereby incorporated herein in its entirety.

A parameter input unit 220 allows entry of parameters which indicate the amount of change in each parameter which is significant such that a new value of the parameter should be transmitted from unit 10 to unit 16.

Figure 5A:
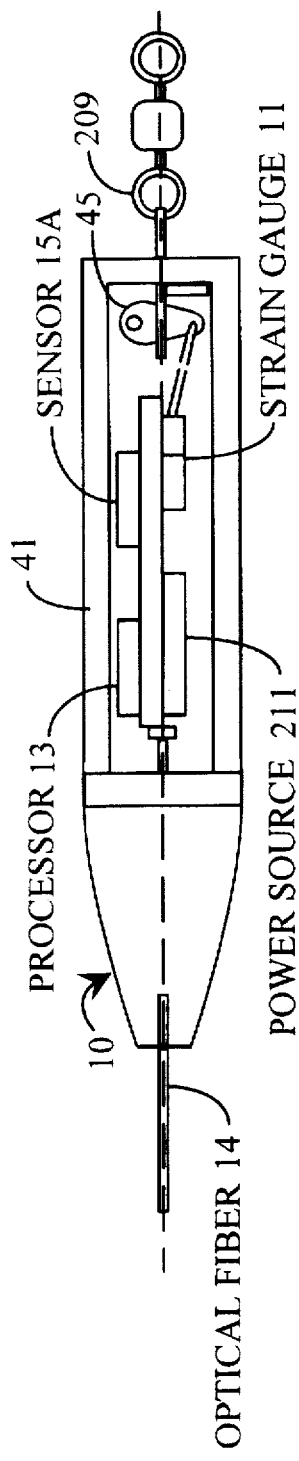
FIG. 5A, 5B and 5C are top, side and front views of the underwater electronic unit.
Figure 5B:
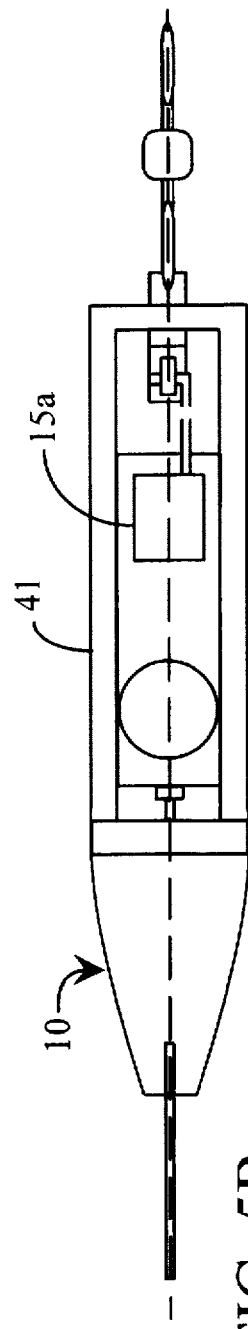
Figure 5C:
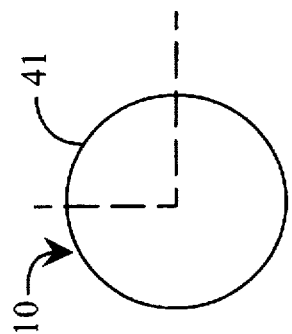

FIGS. 5A, 5B and 5C are top side and front plan views of unit 10. These figures show the physical placement of units inside the shell 41. FIG. 5A shows how the lure 12 is connected to strain gage 11 through a lever arm 45. The shell 41 could be waterproof with waterproof seals at each point something goes through the shell or alternately all the electrical components within shell 41 can be covered with a waterproof sealing material. Attached to processor 13 but not explicitly shown in FIGS. 5A, 5B and 5C is a unit (i.e. program input unit 220) with small switches that allow entry of parameters into the microprocessor 13, ROM memory 204 and RAM memory 205. Power Source 211 also includes and on-off switch not explicitly shown in FIGS. 5A, 5B and 5C.

FIG. 3 is an overall block diagram of the components in electronic unit 16 which is located on the fishing rod 26. Unit 16 includes a microprocessor 20 and an associated LCD display 17. An on-off switch 301 activates the unit. Microprocessor 20 has an associated read only memory (ROM) 302 and a random access memory (RAM) 303. Memories 302 and 303 are shown together in FIG. 1 as memory 19. Unit 16 receives data from optical fiber 14 through a data receiver 307. Input-output bus 308 controls signals to and from the microprocessor. The I/O Bus 308 is connected to buzzer 22, GPS receiver 18, drag control 21 and parameter input unit 315. The unit is powered by a battery and power Supply 316. Each of the individual components in unit 16 are conventional commercially available components. Microprocessor 307 operates in response to a program stored in read only memory 302. The operations performed are shown by the block diagrams in FIGS. 6 and 7.

Figure 4B:
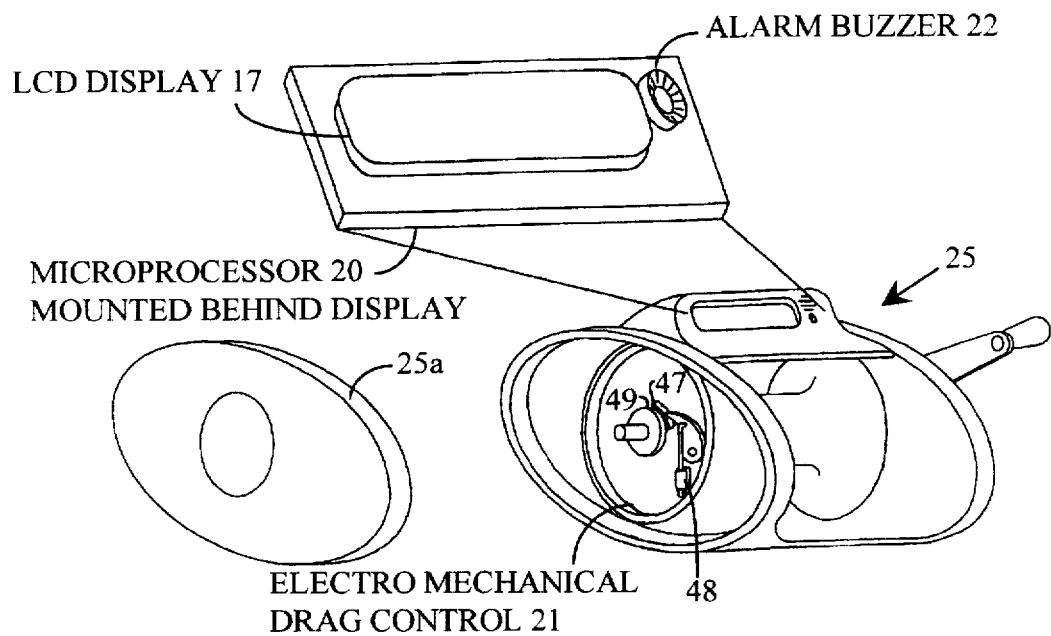
FIG. 4B is an exploded perspective view of the electronic unit and the reel with the associated tension mechanism.
Figure 4A:
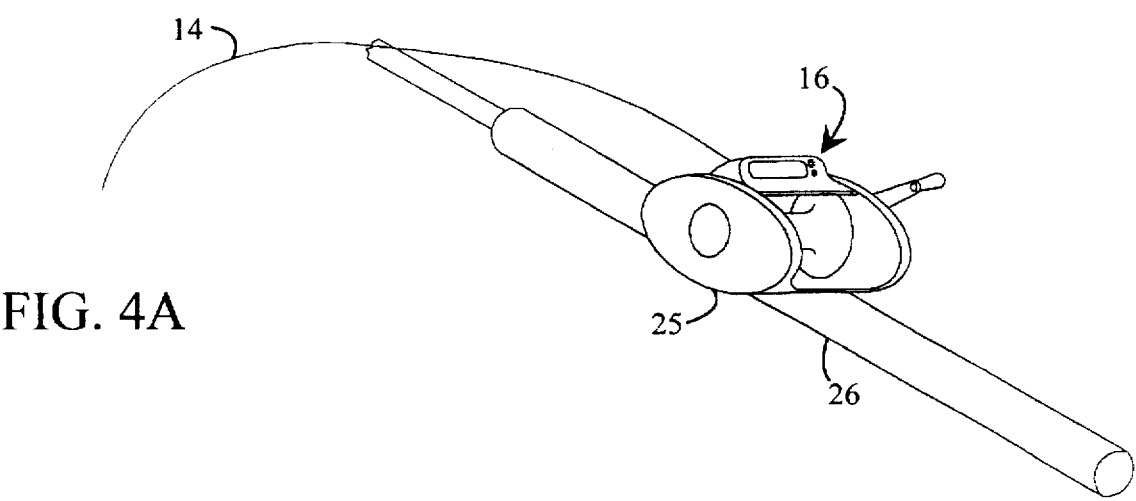
FIG. 4A is a perspective diagram of the fishing rod, fishing reel and the electronic unit located on a fishing rod.

FIG. 4A and 4B are perspective views of unit 16 and the reel 25 on which unit 16 is located. FIG. 4A shows the fishing rod 26, with a reel 25 mounted thereon. Electronic unit 16 is mounted on fishing reel 25.

FIG. 4B shows and exploded view of fishing reel 25 showing the internal structure of drag control 21. As shown in FIG. 4B, the side plate 25A of reel 25 is shown removed so that drag control 21 is visible. Display 17 is also shown in exploded form. The drag control 21 increases or decreases tension by pressing brake shoe 47 against brake cylinder 49. Electromagnet 48 controls brake shoe 47 and it can increase or decrease the tension as directed by microprocessor 20. Not explicitly shown in FIG. 4B are a set of small switches (i.e. program input unit 315) which allow entry of parameters into microprocessor 20. Other units such as ROM 302, RAM 303, GPS receiver 18, etc. are mounted with microprocessor 20 behind LCD 17.

Figure 6:
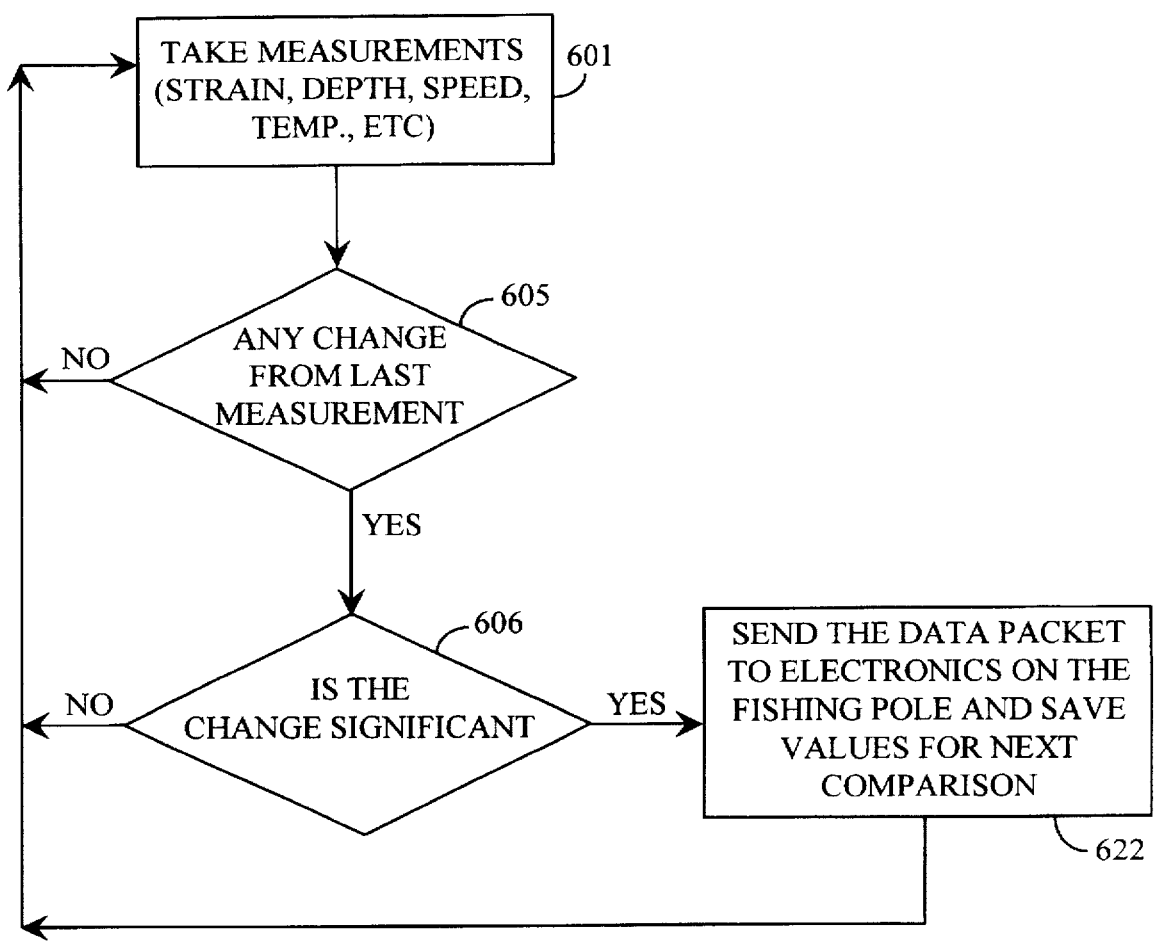
FIG. 6 is a block flow diagram of the computer program executed by the microprocessor in the submersible unit.

FIG. 6 shows the operations performed by the electronics in the probe, that is, FIG. 6 is a block diagram of the computer program stored in read only memory 204 and executed by microprocessor 13. Periodically as indicated by block 601 (under control of a timer, not explicitly shown in the drawings) the strain gage 11 and sensors 15A, 15B and 15C take measurements. The output of strain gage 11 indicates the tension being applied to ring 209 by lure 12. The output of sensors 15A, 15B and 15C indicate the water pressure (i.e. the depth of the lure), the temperature of the water, and the speed of motion through the water. Sensors 15A, 15B, and 15C are merely illustrative of the parameters that can be measured and other parameter such as pH, water clarity, etc. could also be measured. The measurement devices are scanned by multiplexer 202, the outputs are converted to digital form by A to D converter 203 and the measurements are sent to microprocessor 13 and stored in random access memory 205.

As indicated by block 605, the microprocessor 13 next determines if there has been any change in the measurements since the last measurements were stored. If there has been no change in the measurements block 601 is repeated. If there has been a change the program executes block 606.

Block 606 indicated that the program determines if a change in any of the measurements was significant. A significant change is a change greater than a reestablished threshold. For example a significant change may be set to be a change in temperature of one degree or a change of more than four ounces of tension. What constitutes a significant change will be established by experience and will depend upon the type of fishing that is being done. For example in deep sea fishing, what amount to a significant change will be a larger amount than what constitutes a significant change when fishing in shallow water for small fish. If there is no significant change, block 601 is repeated. If there has been a significant change the program goes to block 622. Block 622 indicates that the new data is transmitted from unit 10 to unit 16. When data from any sensor is transmitted, it is transmitted with a tag indicating the sensor from which the data originated (i.e. what the data represents). It is noted that in order to conserve power required to transmit data, it is desirable to set the thresholds as high as possible, but not too high such that significant data will be missed. These values are entered into and stored in Ram 205 by parameter input unit 215.

As indicated by block 622, if the change in any parameter is significant (i.e. is above a preset threshold) the new value is stored in random access memory 205 and the value is transmitted to unit 16 via optical fiber 14.

Figure 7:
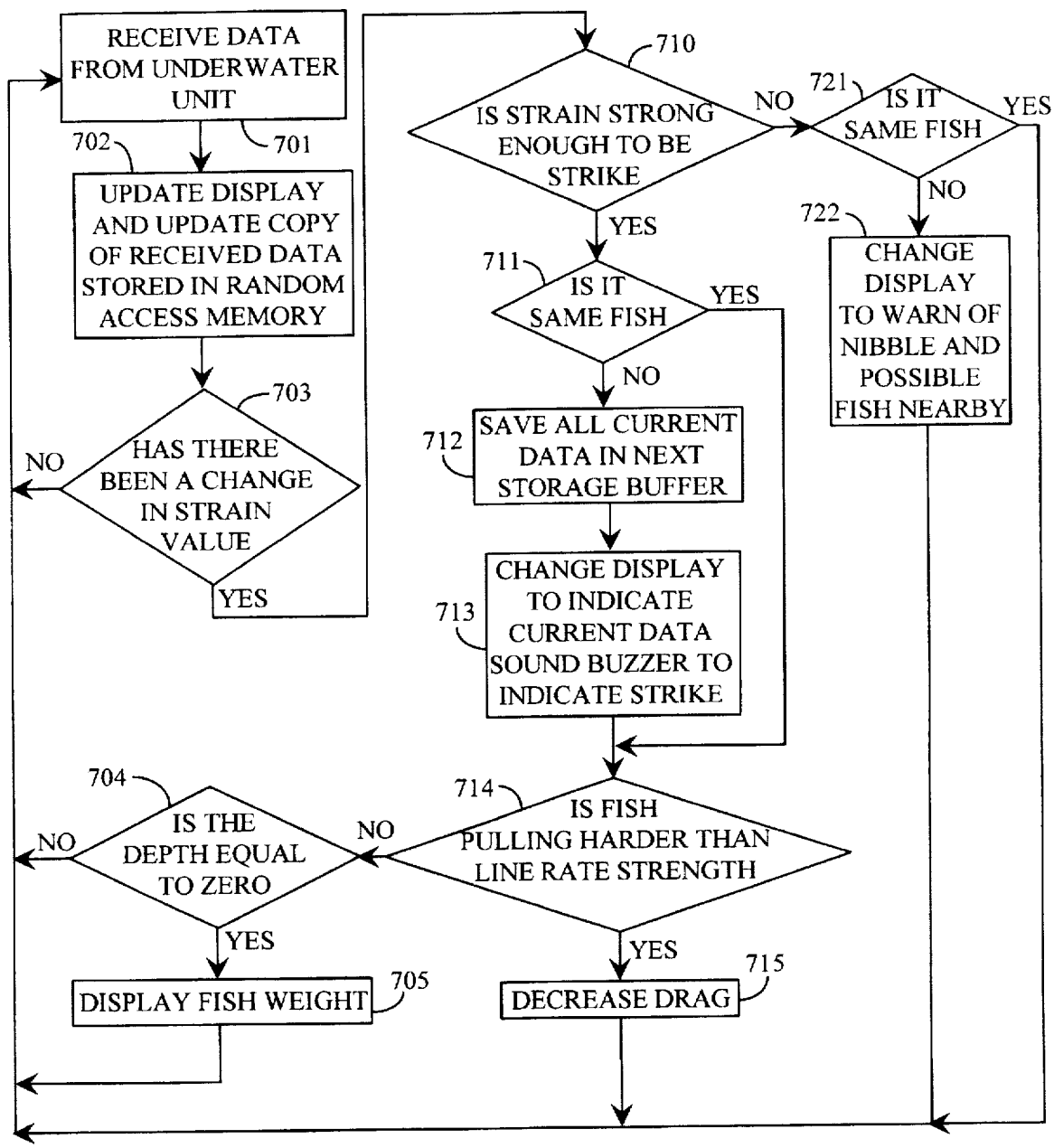
FIG. 7 is a block flow diagram of the computer program executed by the microprocessor in the electronic unit on the fishing rod.

FIG. 7 is a block diagram of the operations performed by the electronics in unit 16, that is, FIG. 7 is a block diagram of the program stored in read only memory 302 and executed by microprocessor 20. As indicated by block 701, the operation begins when data is received by Data receiver 307 from optical fiber 14. As indicated by block 702, the display 17 is updated to show the new value of the parameter, and the new data is stored in memory 303.

Next as indicated by block 703, a check is made to determine if there has been a change in the value of the tension or strain. If there has been a change in strain, block 710 indicates that a check is made to determine if the change is significant enough to represent a strike. If there has only been a small change in strain (less than the amount which indicates a strike) the program goes to block 721, which determines if the change is due to the same fish. That is, if the change comes within a preset time after a similar previous change, it is assumed that the change is due to the same fish. If the change is not due to the same fish a message is displayed on LCD 17 (as indicated by block 722) to warn of a possible nibble or that a fish may be nearby. This will prevent the fisherman from pre-maturely changing the position of the lure.

If the change in strain is strong enough to indicate a strike (block 711), a check is again make to determine if the change is due to the same fish. This is done by determining if the change came with a preset time after a previous strike indication. If the change in strain is not due to the same fish (block 712) all of the parameter values are stored in the next available storage buffer and the buzzer is sounded (block 713).

It is noted that memory 303 is divided into a number of storage buffers for parameter values. One buffer is used to store the last value received for each parameter and this value is used to activate display 17. The memory also has a series of sequential numbered buffers. Each time box 712 indicates that there has been a new strike, the values from each sensor at that time are stored in the next available buffer. When the fishing trip is done, all of the buffers can be read-out to make a record of where each strike occurred and to indicate the values of all parameters at that time.

As indicated by block 714, a check is also made to determine if a fish is pulling harder than the line rated strength. If the tension is too high, tension is released as indicated by block 715.

If the tension is not to high and the depth is zero, it means that the fish is above the surface of the water and the tension at that time indicates the weight of the fish.

While the invention has been shown in the form of preferred embodiments thereof, it should be understood that various changes in form and detail may be made without departing from the spirit and scope of the invention. For example a simple embodiment of the invention could eliminate all sensors 15 in the underwater unit 10 and eliminate the GPS 18 Drag Control and display 17 in unit 16. Such a simplified unit would merely sound a buzzer when a strike occurs. Alternately a simplified unit could eliminate sensors 15 in unit 10 and eliminate the GPS unit 18, Drag Control 21 and Buzzer 22. Such a simplified unit would merely constantly display the amount of tension on line 17. A slightly more sophisticated unit could in addition to constantly displaying the tension give a special display when a strike is detected.

Another somewhat simplified embodiment would merely eliminate drag control unit 21. With such an embodiment instead of automatically adjusting the amount of tension, messages would be displayed on unit 17, instructing the operator to appropriately adjust the tension.

Still another alternate embodiment would not utilize an optical fiber 14 to transmit information from the underwater unit 10 to the unit 16. Instead of an optical system, a conventional wire transmission system could be used or alternately a radio or ultrasound transmission system could be used.

Yet another embodiment of the invention could utilize more sensors in unit 10 than the sensors 15A, 15B, and 15C. In such a more complicated embodiment, many more parameters indicating the underwater conditions could be detected.

It is also noted that many types of strain gages are commercially available. Strain gage 11 could be implemented using a variety of commercially available strain gages. Furthermore the structure 45 could be altered to any known structure which transforms tension on a line to the deformation of a strain gage.

It is also noted that in the embodiment shown herein a relatively small amount of calculations are performed by the microprocessor in the underwater unit and relatively more calculations are performed by the microprocessor in the above water unit. This is done to minimize the amount of data transmitted from the underwater unit to the above water unit and thus minimize battery usage in the underwater unit. Where various calculations are made could be altered in other embodiments of the invention without departing from the spirit of the invention.

The drag control shown in the preferred embodiment is a very simple mechanical drag control which is activated by an electromagnet. It should be understood that various other more complex mechanical drag controls or various types of electrical drag controls could also be used. The details of the drag control per se form no part of the present invention.

While the specific embodiment shown herein includes a lure 12, it should be understood that lure 12 could be replaced by any fish attracting device such as a baited hook or an array of lures and/or baited hooks.

A wide variety of other embodiments of the applicant's invention are also possible. The scope of applicant's invention is limited only by the appended claims.

We claim:

1. A system for alerting an operator when a fish strikes comprising, an underwater unit including a fish attracting device attached to a strain detection device for detecting the amount of strain from said fish attracting device, an above water unit including alerting means for alerting said operator, means for transmitting a signal from said underwater unit to said above water unit when the strain detected by said strain detection device changes, and means for activating said alerting means when said strain changes by more than a preestablished amount.

2. A fishing system including, an above water unit, an underwater unit connected to said above water unit, said underwater unit including a strain detecting device, a fish attracting device attached to said strain detecting device, and means for transmitting to said above water unit, the amount of strain detected by said strain detecting device, and said above water unit including means for responding to the amount of strain detected by said strain detecting device when said strain indicates a strike at said fish attracting device.

* * * * *